United States Patent
Soryal et al.

(10) Patent No.: US 12,307,003 B2
(45) Date of Patent: May 20, 2025

(54) SYSTEM AND METHOD FACILITATING CONNECTIONS BETWEEN DIFFERENT COMPUTER-SIMULATED ENVIRONMENTS

(71) Applicant: AT&T Intellectual Property I, L.P., Atlanta, GA (US)

(72) Inventors: Joseph Soryal, Glendale, NY (US); Venson Shaw, Kirkland, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 293 days.

(21) Appl. No.: 17/985,435

(22) Filed: Nov. 11, 2022

(65) Prior Publication Data
US 2024/0160272 A1    May 16, 2024

(51) Int. Cl.
*G06N 3/006* (2023.01)
*G06F 3/01* (2006.01)
*H04L 67/131* (2022.01)

(52) U.S. Cl.
CPC ............ *G06F 3/011* (2013.01); *H04L 67/131* (2022.05)

(58) Field of Classification Search
CPC .................................. G06F 3/011; G06N 7/01
(Continued)

(56) References Cited

U.S. PATENT DOCUMENTS

| | | |
|---|---|---|
| 2010/0228633 A1 | 9/2010 | Guimaraes et al. |
| 2011/0014985 A1 | 1/2011 | Park et al. |

(Continued)

FOREIGN PATENT DOCUMENTS

| | | | | |
|---|---|---|---|---|
| EP | 4383129 A1 | * | 6/2024 | ............ G06N 3/006 |
| EP | 4383178 A1 | * | 6/2024 | ........... G06F 16/958 |

(Continued)

OTHER PUBLICATIONS

"Fostering interoperability standards for an open metaverse", Metaverse Standards Forum; metaverse-standards.org, Sep. 2022, 16 pgs.

(Continued)

*Primary Examiner* — Ruay Ho
(74) *Attorney, Agent, or Firm* — Guntin & Gust, PLC; Andrew Gust

(57) ABSTRACT

Aspects of the subject disclosure may include, for example, initiating a presence within first metaverse environment, wherein the presence includes a correlation between a physical stimulation of a human interface and first virtual stimuli occurring within the first metaverse environment. A virtual interconnection is initiated between the first metaverse environment and a second metaverse environment including second virtual stimuli occurring within the second metaverse environment. A virtual interaction is determined between the first metaverse environment and the second metaverse environment according to the virtual interconnection and an adjusted virtual stimulus occurring within the first metaverse environment is determined responsive to the virtual interaction between the first metaverse environment and the second metaverse environment. The presence is adjusted according to a correlation between the physical stimulation of the human interface and the adjusted virtual stimuli occurring within the first metaverse environment. Other embodiments are disclosed.

20 Claims, 9 Drawing Sheets

(58) Field of Classification Search
USPC .......................................................... 715/757
See application file for complete search history.

(56) References Cited

U.S. PATENT DOCUMENTS

| | | |
|---|---|---|
| 2014/0082526 A1 | 3/2014 | Park et al. |
| 2022/0080302 A1 | 3/2022 | Bae |
| 2022/0116231 A1* | 4/2022 | Choi ................ G06Q 20/40145 |
| 2022/0242450 A1 | 8/2022 | Sokolov et al. |
| 2022/0329569 A1 | 10/2022 | Chen |
| 2024/0062328 A1* | 2/2024 | Kwatra .................. G06N 3/006 |
| 2024/0156538 A1* | 5/2024 | Roh ........................ A61B 34/10 |

FOREIGN PATENT DOCUMENTS

| | | | |
|---|---|---|---|
| EP | 4383685 A1 * | 6/2024 | ............... G06N 7/01 |
| EP | 4383687 A1 * | 6/2024 | ............. G06Q 50/14 |

OTHER PUBLICATIONS

"Virtual Reality vs. Augmented Reality vs. Mixed Reality", Intel; https://www.intel.com/content/www/us/en/tech-tips-and-tricks/virtual-re . . . , Nov. 10, 2022, 8 pgs.

Hussain, Wazarat A., "The Metaverse Market Map—the Ecosystem of our Emerging Virtual Worlds", The Metaverse Insider; https://metaverseinsider.tech/2022/05/16/the-metaverse-ecosystem-a-market-map-for-our-eme . . . , May 16, 2022, 2 pgs.

Joshi, Shamani, "What Is the Metaverse? An Explanation", Vice; https://www.vice.com/en/article/93bmyv/what-is-the-metaverse-internet . . . , Mar. 15, 2022, 37 pgs.

Williamson, Paul, "Why Arm is the Gateway to the Metaverse—Arm Blueprint", Arm Blueprint; https://www.arm.com/blogs/blueprint/metaverse, Feb. 24, 2022, 12 pgs.

* cited by examiner

300

SYSTEM AND METHOD FACILITATING CONNECTIONS BETWEEN DIFFERENT COMPUTER-SIMULATED ENVIRONMENTS

FIELD OF THE DISCLOSURE

The subject disclosure relates to a system and method facilitating connections between different computer-simulated environments.

BACKGROUND

Computer-simulated environments, sometimes referred to as virtual worlds exist within the greater world wide web (the web), or in localized networks. The term "metaverse," refers to a particular virtual world in which participants are represented by depictions called "avatars." Avatars may include a user's depiction of themselves based on a 2-dimensional (2D) or 3-dimensional (3D) image that they want to present within the metaverse. Avatars may be created by building on a base model, e.g., a template, and adding various accessories or traits which personalize the avatar.

The Metaverse is an extended immersive reality environment where people virtually meet and interact to conduct gaming, business, social activities, etc. The Metaverse is a collection of segmented environments that are separate per a Metaverse service offering companies and group of users—which mean every Metaverse environment is a separate instance and there is no interaction, by default, between different environments for the same service provider, and also no interactions between Metaverse environments between different service providers.

The development of virtual worlds has been furthered by such companies as Second Life and There.com. Some early products were developed in a virtual reality markup language (VRML), a standard file format for representing 3D interactive vector graphics. Other tools include X3D, developed as an open format, for declaratively representing 3D computer graphics. Some implementations utilize X3D as a base standard while permitting developers to add extensions for functionality. Products like Second Life do not run in a web browser, or use Hypertext Transfer Protocol (HTTP), as defined by RFC 2616. Instead, these products utilize custom client software that may be distributed freely to promote greater adoption.

A Web application programming interface (API), such as WebXR Device API is a, describe support for accessing augmented reality and virtual reality devices, such as the HTC Vive, Oculus Rift, Oculus Quest, Google Cardboard, HoloLens, Magic Leap or Open Source Virtual Reality (OSVR), in a web browser. For example, the WebXR Device API exposes interfaces, such as XRView, XRPose, that allow web applications to present content in virtual reality and augmented reality.

BRIEF DESCRIPTION OF THE DRAWINGS

Reference will now be made to the accompanying drawings, which are not necessarily drawn to scale, and wherein.

DETAILED DESCRIPTION

Figure 1:
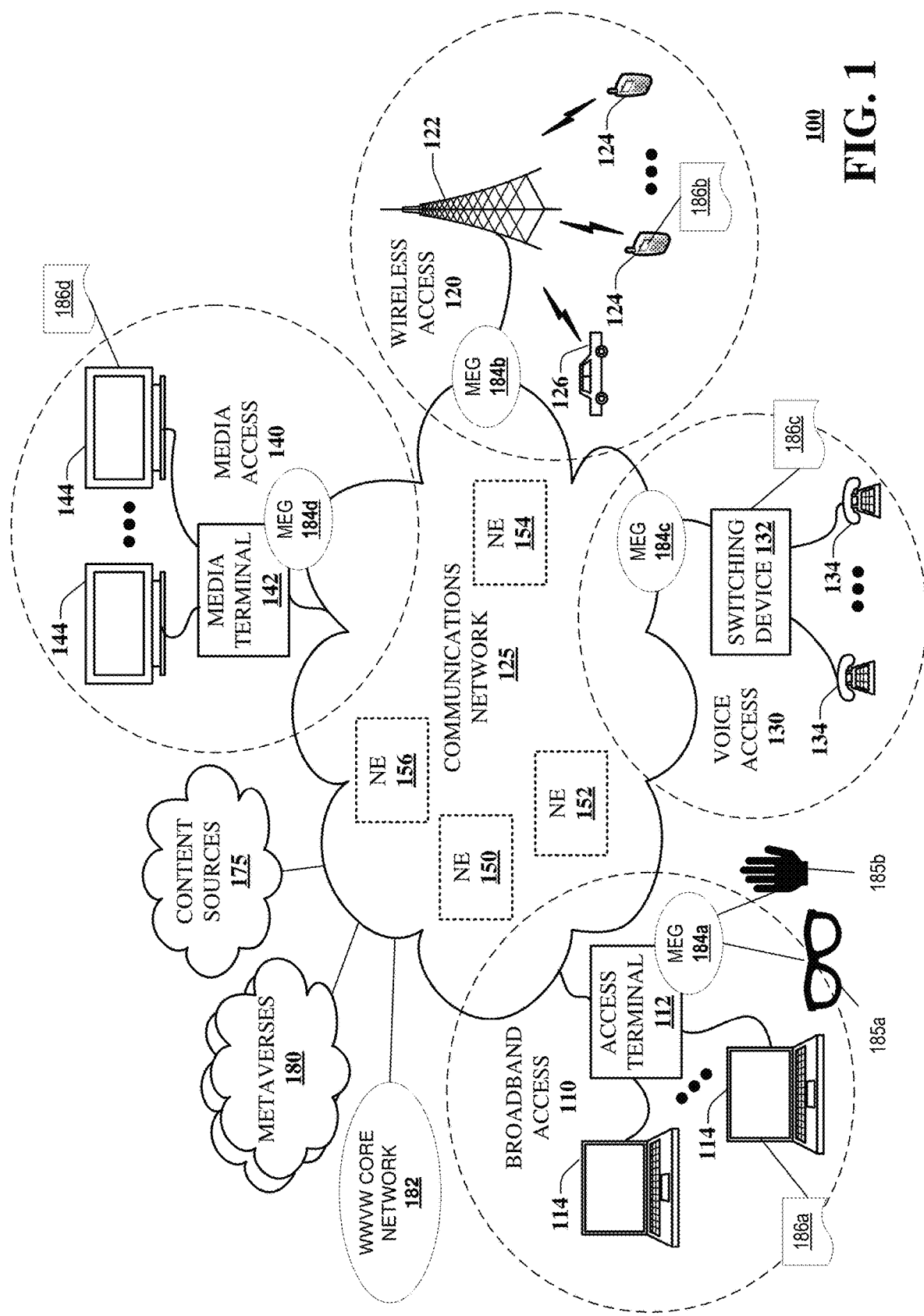
FIG. 1 is a block diagram illustrating an exemplary, non-limiting embodiment of a communications network in accordance with various aspects described herein.

The subject disclosure describes, among other things, illustrative embodiments for initiating a virtual interconnection between first and second virtual environments, determining a virtual interaction between the two virtual environments according to the virtual interconnection, and determining an adjusted virtual stimulus occurring within the first virtual environment responsive to the virtual interaction between the two virtual environments, wherein a presence within the first virtual environment is adjusted according to a correlation between a physical stimulation of the human interface and the adjusted virtual stimuli. Other embodiments are described in the subject disclosure.

One or more aspects of the subject disclosure include a system, having a processing system including a processor and a memory that stores executable instruction. The executable instructions, when executed by the processing system, facilitate performance of operations that include establishing a first presence within first metaverse environment, wherein the first presence includes a first correlation between a first physical stimulation of a first human interface and first virtual stimuli occurring within the first metaverse environment. The operations further include establishing a virtual interconnection between the first metaverse environment and a second metaverse environment including second virtual stimuli occurring within the second metaverse environment. Further according to the operations, a virtual interaction is characterized between the first metaverse environment and the second metaverse environment according to the virtual interconnection between the first metaverse environment and the second metaverse environment. A first adjusted virtual stimuli is identified occurring within the first metaverse environment responsive to the virtual interaction between the first metaverse environment and the second metaverse environment, wherein the first presence is adjusted according to a correlation between the first physical stimulation of the first human interface and the first adjusted virtual stimuli occurring within the first metaverse environment.

One or more aspects of the subject disclosure include a process that includes initiating, by a processing system comprising a processor, a presence within first metaverse environment. The presence includes a correlation between a physical stimulation of a human interface and first virtual stimuli occurring within the first metaverse environment. The process further includes initiating, by the processing system, a virtual interconnection between the first metaverse environment and a second metaverse environment including second virtual stimuli occurring within the second metaverse environment. Further according to the process, a virtual interaction is identified by the processing system, between the first metaverse environment and the second metaverse environment according to the virtual interconnection between the first metaverse environment and the second metaverse environment. A determination is made, by the processing system, to obtain an adjusted virtual stimulus occurring within the first metaverse environment responsive to the virtual interaction between the first metaverse environment and the second metaverse environment. The presence is adjusted according to a correlation between the physical stimulation of the human interface and the adjusted virtual stimuli occurring within the first metaverse environment One or more aspects of the subject disclosure include a non-transitory, machine-readable medium, including executable instructions that, when executed by a processing system including a processor, facilitate performance of operations. The operations include initiating a presence within first metaverse environment, wherein the presence includes a correlation between a physical stimulation of a human interface and first virtual stimuli occurring within the first metaverse environment. A virtual interconnection is initiated between the first metaverse environment and a second metaverse environment including second virtual stimuli occurring within the second metaverse environment. A virtual interaction is determined between the first metaverse environment and the second metaverse environment according to the virtual interconnection and an adjusted virtual stimulus occurring within the first metaverse environment is determined responsive to the virtual interaction between the first metaverse environment and the second metaverse environment. The presence is adjusted according to a correlation between the physical stimulation of the human interface and the adjusted virtual stimuli occurring within the first metaverse environment.

The systems, devices, processes and software disclosed herein facilitate access to and/or interactions between multiple, independent virtual environments. In at least some embodiments, access to and/or interaction between different metaverses may be facilitated by a World-Wide Virtual Web (WWVW) providing connectivity between different metaverse environments and/or related settings to allow virtual interactions between the users and/or the different metaverse environments themselves. For example, part of a virtual world-wide web (WWW) may include infrastructure for routing of virtual content, with corresponding DNS services to connect one metaverse environment to others. Consequently, virtual experiences may be joined, linked and/or otherwise tied together to share some aspect of one virtual environment with another. Consider a first metaverse Environment that is conducted in a snow cave and a second metaverse environment that is conducted in a tropical forest. According to the techniques disclosed herein the two virtual environments may be interconnected via a virtual window, door or portal, such that a virtual temperature existing near the virtual door, as may be experienced, or felt by the users, varies according to the interconnection. Thus, the snow cave virtual environment experiences higher temperatures, whereas, the tropical forest experiences cooler temperatures proximate to the interconnected pathway.

The virtual environments may include computer-simulated environments, sometimes referred to as metaverses. A metaverse is understood to provide a graphically rich virtual space, which may offer an appearance of at least some degree of reality, where people can work, play, shop, socialize. At least one defining attribute an immersive virtual reality environment, such as a metaverse, is "presence," which may extend to users a feeling as through they are really there, in the virtual environment, along with other participants. Participants, or users, may control avatars configured to participate in virtual interactions within the virtual environment that may include, for example, exchanging, sending, receiving and/or teleporting, items such as holographs. Alternatively, or in addition, interactions may include experiences that may include one or more of visual stimuli, aural stimuli, tactile stimuli that me translate virtual environmental conditions to a physical realm of the participants.

In at least some embodiments, a user immersed in a first virtual environment may interact contemporaneously with a second virtual environment. The first and second virtual environments may be independent, for example, being hosted by different metaverse service providers, possibly operating according to different rules, commands. Example interactions may include, without limitation, teleportation of a first virtual entity, such as a hologram generated in the first virtual environment, to the second virtual environment. In at least some embodiments, the teleported first virtual entity may interact with objects and/or environmental conditions in the second virtual environment. In at least some embodiments, such interactions between different and independent metaverses may occur in real time and/or near real time, without necessarily requiring any special coordination beforehand, except perhaps establishing authentication credentials as may be required.

Referring now to FIG. 1, a block diagram is shown illustrating an example, non-limiting embodiment of a system 100 in accordance with various aspects described herein. For example, system 100 can facilitate in whole or in part initiating a virtual interconnection between first and second virtual environments, determining a virtual interaction between the two virtual environments according to the virtual interconnection, and determining an adjusted virtual stimulus occurring within the first virtual environment responsive to the virtual interaction between the two virtual environments, wherein a presence within the first virtual environment is adjusted according to a correlation between a physical stimulation of the human interface and the adjusted virtual stimuli. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc., for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc., can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

The example system 100 may include one or more independent virtual spaces 180 configured to provide separate computer-simulated environments populated by avatars configured to explore the virtual spaces 180 simultaneously and independently, participate in activities and communicate with others. The virtual spaces 180 may include spatial capabilities, e.g., 3D capabilities, which respond to input from a user in real time, e.g., rendering in real time, to provide an immersive experience. In at least some instances, the virtual spaces 180 may be persistent, massively scaled in expanse and/or diversity. The virtual spaces 180 may be synchronous in that they allow users to interact and share simultaneous experiences in real time. The virtual spaces 180 may be private metaverses hosted by respective metaverse service providers that offer a variety of experiences, from gaming and virtual workspaces to live entertainment and real estate. Examples include, without limitation, platforms like Axie Infinity, Horizon, Fortnite, Roblox Sandbox and Decentraland, a virtual world browser-based platform. Such services offer immersive virtual worlds, as well as tools that allow users to build monetizable projects within those worlds.

The users may access one or more of the independent virtual spaces 180 via the communication network 125 according to one or more of the broadband access 110, the wireless access 120, the voice access 130, and/or the media access 140. The user's may interact with the virtual spaces 180 via one or more human interface devices, such VR goggles 185a, haptic gloves 185b. Other human interface devices may include the display devices 144, the data terminals 114, the mobile devices 124 and/or the telephony devices 134. Human interaction may be vocal, including verbal communication, textual and/or graphical. The user interface devices may provide one or more of audio, video, tactile feedback to a user. Other user interface devices may be used alone or in combination with the access networks 110, 120, 130, 140. Example human interface devices may be classified according to the sensation type. For example, visual and auditory information may be provided by head mount displays and/or speakers, while tactile information may be provided by haptic actuators that exploit mechanical or electrical mechanisms. Haptic technologies sense and replicate various tactile sensations generated by interactions with the environment, such as those due to dynamic variations in pressure, shear forces and temperature, with sensors and/or actuators.

The example system 100 further includes an information system configured to support virtual environments. In at least some embodiments, the information system may adopt at least some capabilities of the world wide web, referred to herein as a world-wide virtual web (WWVW). It is envisioned that the virtual environments may be hosted and/or otherwise supported by one or more network-accessible servers, e.g., metaverse servers. The metaverse servers may execute one or more virtual environment supporting application programs, such as graphics engines, 2D and/or 3D renderers, as well as other application programs and/or systems that support manipulation, presentation and/or storage of holographic entities, avatars, objects, sounds, images, moving images, text, documents and so on. The metaverse servers, the virtual environment applications, objects and/or entities may be associated with unique identifiers, e.g., unique addresses.

In at least some embodiments, the metaverses may adopt a client-server model, in which virtual reality client applications 186a, 186b, 186c, 186d, generally 186, communication with metaverse servers over a network 125, such as a LAN or the Internet. The client applications may be configured to support one or more human interface device 185, e.g., controlling these devices according to the particulars of the metaverse servers. Such control may manipulate a physical aspect of the human interface devices 185 according to a virtual aspect of the virtual environment. Physical aspects may include, without limitation, an image, a sound, a text message, a pressure, a temperature, and/or other tactile response such as a vibration. Alternatively, or in addition, such control may manipulate a virtual aspect of the virtual environment according to a physical aspect of the human interface devices 185. For example, a user wearing a haptic glove 185b may performing a grasping motion. The haptic glove 185b may convert the physical motion to an electrical signal that may be conveyed to a corresponding metaverse server to impart a virtual grasping of a virtual object in the virtual environment 180.

The example system 100 includes a core network, e.g., a WWVW core network 182, and one or more metaverse environment gateway (MEG) devices 184a, 184b, 184c, 184d, generally 184. The WWVW core network 182 may be configured to provide user access to virtual spaces 180. In at least some embodiments, the WWVW core network 182 alone or in combination with the MEG devices 184 may facilitate connectivity between two or more of the independent virtual environments 180. For example, a user engaging a first virtual environment through an individualized first avatar defined and/or otherwise operating within the first virtual environment may contemporaneously interact with a second, independent virtual environment.

Interaction between virtual environments may be implemented in a first direction, e.g., from the first virtual environment to the second virtual environment, from the second virtual environment to the first virtual environment and/or bidirectionally between both independent virtual environments. For example, the first avatar defined and/or otherwise operating within the first virtual environment may be exposed to and/or otherwise experience stimuli generated within a context of the second virtual environment. Without limitation, stimuli may include one or more stimuli as may be perceptible to the user, e.g., according to the user's particular suite of human interface devices 185. By way of example, stimuli may include visual stimuli, e.g., 2D, 3D and/or holographic stimuli, audible stimuli, tactile stimuli, e.g., including pressure and/or temperature, textual stimuli, and so on.

Alternatively, or in addition, the first avatar defined and/or otherwise operating in the first virtual environment may provide stimuli to change and/or otherwise modify some aspect of the second, independent virtual environment. Such modifications may include, without limitation, projecting into the second, independent virtual environment one or more of an image, a sound, a touch, a modification of a virtual object defined and/or existing within the second virtual environment, e.g., by changing its shape and/or repositioning it. For example, the first avatar defined and/or otherwise operating within the first virtual environment may speak an/or direct a gesture, e.g., a wave, to the second avatar defined and/or otherwise operating within the second, independent virtual environment. In at least some embodiments, the other avatar may observe the projection, e.g., the sound and/or gesture substantially synchronously with an action by the first avatar within the first virtual environment. Similarly, the first avatar defined and/or otherwise operating in the first environment may synchronously manipulate an object within the second environment by moving and/or changing a shape or configuration of the object. Such manipulations of the object within the second virtual environment may occur substantially synchronously with manipulations by the first avatar in the first virtual environment, such that the second avatar may observe the manipulations in real time.

In at least some embodiments, a user participating within the first virtual environment may initiate a virtual portal between the first virtual environment and a second, independent virtual environment. For example, the user may identify the second virtual environment, possibly identifying one or more of a first location within the first virtual environment and a second location location within the second virtual environment between which the virtual portal should be established. In at least some embodiments, the first location within the first virtual environment may be inferred from a virtual location of the user's avatar within the first virtual environment. In at least some embodiments, one or more aspects of the virtual portal may be defined and/or otherwise controlled. For example, the portal size, and/or duration of its existence may be selected by the first user and/or otherwise determined from a user preference as may be stored in a user profile and/or determined according to some default value and/or range established by a service supporting the first virtual environment. Understanding that environmental conditions of the first virtual environment may differ from virtual environmental conditions of the second virtual environment, controllable aspects of the virtual portal may address exposure and/or environmental consequences of the virtual portal. Environmental conditions may include, without limitation, ambient conditions, such as illumination, sound, temperature, mobility, pressure. In at least some embodiments, the first and second virtual environments may be configured to implement respective physics, such as gravity, motion, and so on. To the extent the physics differ, a rule and/or policy may determine whether an environmental interaction may occur and, if so, to what extent the environmental interaction may permeate In at least some embodiments the WWVW core network 182 may include infrastructure configured to route related message traffic to connect one metaverse environment to another. The WWVW service may be configured as an overlay to a traditional network, such as a LAN and/or the Internet and functions, effectively functioning as a logical layer that connects two or more of the independent virtual environments together. For example, an instance of a first virtual environment may be associated with a unique address, e.g., a type of uniform resource locator, that may identify the metaverse instance and/or provide a functional link to the environment. Alternatively, or in addition, aspects of a virtual environment, or metaverse, such as environmental conditions, objects present within the environment, avatars defined and/or present within the environment and so on may be associated with unique addresses. Accordingly, a first user participating with the first virtual environment of the preceding examples may identify the second virtual environment by an address of a server hosting that environment and/or an instance of the virtual environment as may have been generated and/or otherwise manipulated by the hosting server.

Figure 2A:
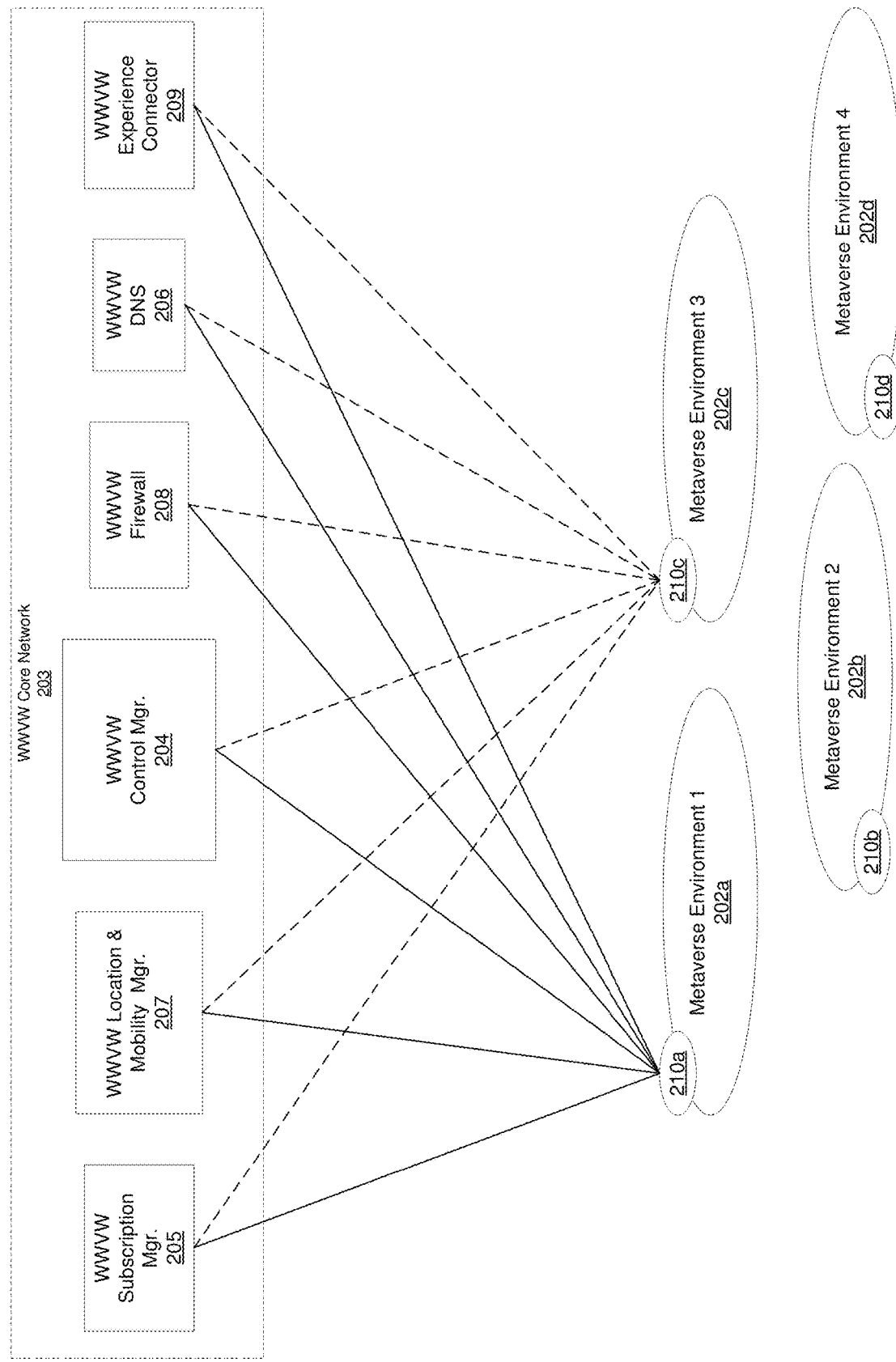
FIG. 2A is a block diagram illustrating an example, non-limiting embodiment of a world-wide virtual web (WWVW) system for computer-simulated environments functioning within the communication network of FIG. 1 in accordance with various aspects described herein.

FIG. 2A is a block diagram illustrating an example, non-limiting embodiment of a world-wide virtual web (WWVW) system 200 for computer-simulated environments functioning within the communication network of FIG. 1 in accordance with various aspects described herein. The example system 200 includes a first metaverse environment 202a, a second metaverse environment 202b, a third metaverse environment 202c and a fourth metaverse environment 202d. At least some of the metaverse environments 202a, 202b, 202c, 202d, generally 202, may be hosted on respective servers (not shown) operated by different metaverse service providers, possibly according to different supporting metaverse applications, and/or different metaverse environmental conditions, and/or different virtual object definitions, and/or different message structures, and/or different interface requirements for various human interface devices. Alternatively, or in addition, at least some of the metaverse environments 202 may be hosted by the same metaverse service providers, possibly on the same server and differing by configuration of the virtual environment, e.g., depicting different virtual locations, and/or different avatars and/or different virtual objects and/or different environmental conditions and/or applied physics. Such different configurations of a common virtual environment may correspond to different virtual regions, e.g., different neighborhoods, office buildings, conference rooms, and the like. Alternatively or in addition, the different configurations may correspond to different groups of avatars as may choose to congregate at a virtual location to interact, possibly to the exclusion of other, non-invited avatars. In some instances, a common region of the environment may be duplicated to present two separate and distinct experiences to respective participants.

The example system 200 also includes a core network 203 in communication with each of the metaverse environments 202. The core network 203 may include one or more of a control manager 204, a subscription manager 205, a DNS node 206, a location and mobility manager 207, a firewall 208 and an experience connector 209. The control manager 204 may be configured to initiate, support and/or otherwise terminate virtual connections between different virtual environments, as may occur when two or more sets of users and/or managers of private virtual environments decide to connect the two environments. For example, the control manager 204 may be configured to obtain information from one virtual environment and to direct that information to another virtual environment. Without limitation, information may be in the form of a medial feed, a video feed, an audio feed, a holographic presentation feed, various other sensor feeds, e.g., environmental sensor feeds, such as thermal sensors, acceleration sensors, light sensors, and the like. In at least some embodiments, the control manager 204 may be configured to facilitate a movement of an object, e.g., a teleporting of a hologram, from one private environment to another. In at least some embodiments, one or more of the various media feeds may include streaming media.

It is understood that in at least some embodiments, access to a virtual environment may be offered to users as a subscription service. Accordingly, subscriptions must be managed. The subscription manager 205 allows users, and/or owners, and/or managers of private environments to subscribe to a corresponding virtual environment service. In at least some embodiments, the subscription may include permissions and/or restrictions to certain features as may be offered by a service provider. For example, there may be different levels of subscription that might allow some participants to generate avatars capable of moving within and/or observing a virtual environment, without necessarily being able to generate, modify and/or otherwise manipulate virtual objects within the environment. A higher level of subscription may allow for such manipulations, while still other levels of subscription may provide user access to interconnections between different virtual environments. Subscriptions to interconnections may be managed further, e.g., separately permitting observations, sensations, manipulation and/or teleportation between the connected virtual environments.

In at least some embodiments, a connection to the WWVW may be managed by subscription. For example, a user, owner, and/or manager of a private virtual environment may permit independent access to and/or discovery of one or more aspects of the private virtual environment. At least some managed aspects may include a sharing of the existence of the virtual environment, e.g., allowing it to be discovered according to a search command as may be entered by a web browser and/or WWVW browser application, and/or permission to establish an interconnection to another virtual environment.

It is worth noting here that each of the example metaverse environments 202 is associated with a respective metaverse environmental gateway (MEG) node 210a, 210b, 210c, 210d, generally 210. The MEG node 210 may be assigned a unique identifier, e.g., a WWVW address and registered in some capacity by the core network 203. The MEG node 210 may be configured to manage communications and/or interactivity with the associated metaverse environment 202. Alternatively, or in addition, the MEG node 210 may be configured to interoperate with one or more human interface devices. Interoperation may include receiving signals from human interface devices, the signals corresponding to physical manipulation of the interface device. For example, signals may include textual content, video content, audio content, tactile content, position information, motion information. The physical environment signals may be received by the respective MEG node 210 and, in at least some instances, translated to a suitable format for interacting with the corresponding metaverse environment 202. Alternatively, or in addition, messages containing virtual environment information, e.g., virtual environment signals, originating in the corresponding metaverse environment may be interpreted and/or translated to a suitable format for interaction with one or more human interface devices. For example, signals may include textual content, video content, audio content, tactile content, position information, motion information. The signals may be received by the respective MEG node 210 and, in at least some instances, translated to a suitable format for interacting with the corresponding human interface devices.

The MEG 210 may be connected to a network, such as a LAN and/or the Internet, and as such, be provisioned with a physical and/or logical network address. It is envisioned that a user, owner and/or manager may register their MEG 210 may register the MEG 210 with a DNS node 206. The DNS node 206 may assign the MEG 210 with a unique address, e.g., a unique WWVW address. In at least some embodiments, the unique WWVW address may associate the MEG 210 with a virtual environment, object and/or service.

According to the illustrative example, the location and mobility manager 207 node associates an actual network IP address with a WWVW address. The WWVW address may represent a logical address, such that the WWVW may be implemented as a logical overlay of the underlying network, e.g., the LAN and/or the Internet. It is envisioned that a user may access a virtual environment via a communication and/or computing device, such as a laptop computer, a desktop computer, a tablet computer, a mobile phone, a smart television, a wearable device, such as a smart watch and/or VR goggles. Some of the user interface devices may be static, e.g., a home or office workstation or smart TV, while others may be mobile. Accordingly, the location and mobility manager 207 may be configured to identify one or more of a physical device location, a physical network location and/or a logical network location of one or more of the MEG 210 and/or the user interface devices. It is envisioned further that the MEG 210 may be provided locally, e.g., proximate to the user and/or the user interface devices. For example, the MEG 210 may be provided in a residential gateway, within a computing device, at a cellular base station, within a mobile device and the like. By identifying and/or otherwise tracking a mobile device and/or mobile MEG 210, the core network 203 is able to manage communications between the MEG 210, and/or the human interface devices and/or the metaverse environment 202.

In at least some embodiments, the firewall 208 may be provided, e.g., as part of the core network 203. The firewall 208 may be configured to ensure that only allowable user, items, and/or experiences are connected between two or more virtual environments. The firewall 208 may incorporate one or more generally well understood firewall features adapted to permit authorized access and/or interactivity, while prohibiting and/or otherwise blocking unauthorized access. Accordingly, the firewall 208 may include an identification and/or authorization function.

The experience connector 209 may ensure that an experience, such as sensory experiences such as temperature, light, imagery, sound, physical forces, wind, etc., may be shared between two virtual environments. Similarly, if a User_B has a virtual object that represents a physical object in User_A's physical environment, the experience connector 209 may operate to ensure that the two representations (virtual and physical) are connected.

Basically the MEG nodes 210 and the WWVW are connected via an existing physical network, such as a LAN and/or the Internet. The WWVW may be implanted as a logical overlay to the physical network, e.g., functioning as a logical layer that connects different virtual environments, objects, experiences together. In at least some embodiments, all the communications go through the firewall 208 to enforce configurable lists, and/or parameters, and/or objects. For example: one environment may not welcome an individual hologram so they will be blocked, or the firewall may block the teleportation of a virtual weapon such as a gun.

The experience connector 209 may be configured to translate parameters of one environment of a connected group of environments to another environment of the group. Parameters may include, without limitation, environmental and/or ambient conditions of the environments. By way of example, such parameters may include a geographic location, a weather condition, a temperature, motion, illumination, sound, and so on. By way of example, an interconnection may be established between a cold environment, e.g., the North Pole, to a warm climate, e.g., a tropical island. A user may initiate transport of a hologram from a cold environment of the North Pole to the warm environment of the tropical island. The transported hologram may be modified, e.g., in cooperation with the experience connector 209, to effectively feel the temperature changes and relay these senses to equipment of a user in the physical environment. For example, the user may be wearing a thermally active device, such as a wrist band, a collar and/or a garment, e.g., a jacket or vest, as may be equipped with thermal transducers, e.g., thermoelectric coolers and/or heaters. The thermoelectric transducers may be adapted to react to input provided via the experience connector 209, e.g., via the control manager 204.

Figure 2B:
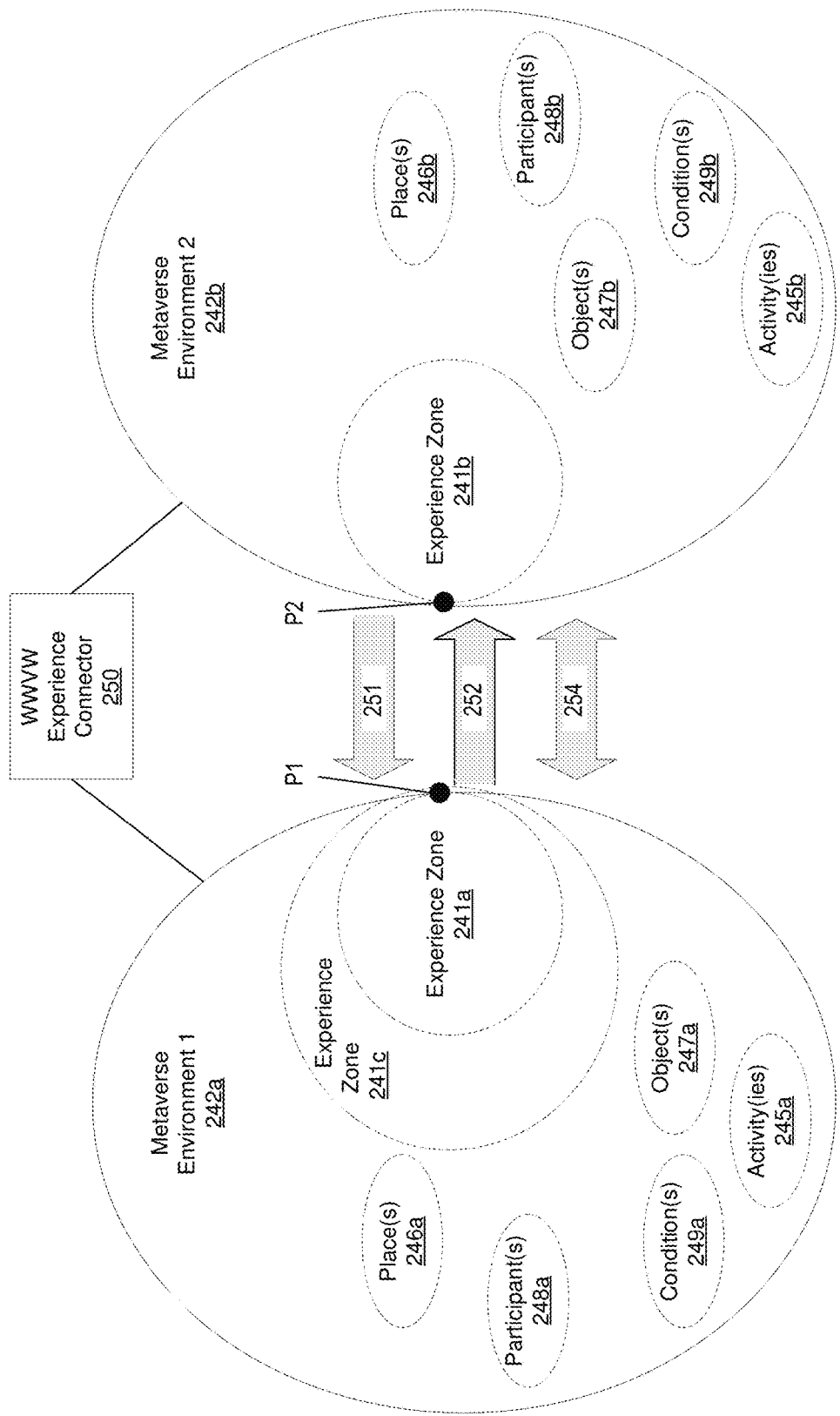
FIG. 2B is a schematic diagram illustrating an example, non-limiting embodiment of an experience connector functioning within the communication network of FIG. 1 and supporting interaction between different computer-simulated environments in accordance with various aspects described herein.

It is envisioned that in at least some embodiments, the experience connector 209 may be configured to manage an experience due to an interaction, e.g., a virtual interconnection, between two virtual environments or metaverses 202. Turning next to FIG. 2B, a schematic diagram illustrates an example, non-limiting embodiment of an experience connection system 240 functioning within the system 100 of FIG. 1 and supporting interaction between different computer-simulated environments in accordance with various aspects described herein. According to the illustrative example, a first metaverse environment 242a may be virtually interconnected to a second, independent metaverse environment 242b, such that at least some level of interaction results from the interconnection. Here, an experience connector 250 may be in communication with one or both of the first and second metaverse environments 242a, 242b and configured to manage interactivity between the different metaverse environments 242a, 242b.

It is understood that the first metaverse environment 242a may include one or more attributes, such as place(s) 246a, object(s) 247a, participant(s), e.g., avatar(s) 248a, condition(s) 249a, and/or activity(ies) 245a, all shown in phantom. Likewise, the second metaverse environment 242b may include one or more attributes, such as place(s) 246b, object(s) 247b, participant(s), e.g., avatar(s) 248b, condition(s) 249b, and/or activity(ies) 245b, also shown in phantom. The metaverse environments 242a, 242b are illustrated as ovals having an outer boundary that may represent a spatial relationship, e.g., according to a grid and/or a geocoordinate. Alternatively or in addition the boundary may represent some other delimiter of the metaverse environments 242a, 242b, such as a range as may be determined according to a rule, a policy, a user preference and/or some other bound. Consider an expansive metaverse configured to support massive number of participants. It is conceivable that such a large metaverse may be accessed and/or otherwise rendered according to subregions as may be determined according to a particular participating user, avatar and/or group of avatars.

The illustrative example also includes a first arrow 251 directed from the second metaverse environment 242b towards the first metaverse environment 242a. This arrow 251 suggests a preferred direction to interactivity as may be imposed and/or otherwise managed by the experience connector. Namely, at least some aspect of the second metaverse environment 242b may be experienced within the first metaverse environment 242a, e.g., according to a rule imposed by the experience connector 250. In view of the imposed direction of the first arrow 251, the second metaverse environment 242b does not experience any aspect of the first metaverse environment 242a. Such directional interactivity may be implemented as a one-way door or mirror, e.g., allowing interaction in the preferred direction only, while prohibiting interactions in the reverse direction. In at least some embodiments, the second metaverse environment may not provide any indication by way of environmental impact and/or perception to participating avatars 248b that the virtual interconnection has been established.

Similarly, the illustrative example also includes a third arrow 254 direct from the first metaverse environment 242a towards the second metaverse environment 242b. This arrow suggests a preferred direction to interactivity as may be imposed and/or otherwise managed by the experience connector 250. Namely, at least some aspect of the first metaverse environment 242a may be experienced within the second metaverse environment 242b, e.g., according to a rule imposed by the experience connector 250.

In at least some embodiments, the experience connector 250 may initiate a virtual interconnection between the first and second metaverse environments 242a, 242b that permits bidirectional interactivity. Accordingly, at least some aspect of the first metaverse environment 242a may be experienced within the second metaverse environment 242b, while at least some aspect of the second metaverse environment 242b may be experienced within the first metaverse environment 242a, as indicated by a second bidirectional arrow 252.

It is further understood that one or more rules, policies, preferences and/or conditions may be imposed upon any of the aforementioned interactivities between the metaverse environments 242a, 242b. In some embodiments, permissions and/or restrictions may be imposed by a user preference within the first metaverse environment 242a, e.g., selectively permitting and/or restricting one or more of the environmental aspects of the second metaverse environment from affecting the first metaverse environment 242a. For example, rendered graphical data of place(s) 246b, object(s) 247 and/or participant(s) 248b of the second metaverse environment 242b may be observable from the first metaverse environment 242a, but not audible. Alternatively, place(s) 246b, object(s) 247 and/or participant(s) 248b of the second metaverse environment 242b may be observable, and audible, but not transportable between the environments 242a, 242b. Alternatively, place(s) 246b, object(s) 247 and/or participant(s) 248b of the second metaverse environment 242b may be observable, audible, and transportable between the environments 242a, 242b, however, other conditions, such as environmental conditions, e.g., temperature and/or movement of the second metaverse environment 242b may not experienced within the first metaverse environment 242a. Alternatively, environmental conditions, e.g., temperature and/or movement of the second metaverse environment 242b may be permitted and/or otherwise translated into the first metaverse environment 242a, whereas other aspects may be permitted and/or restricted according to the rules, policies, preferences and/or conditions as may be in place between the two virtual metaverses 242a, 242b.

It is envisioned that in at least some embodiments, an experience zone may be provided. According to the illustrative example, a first experience zone 241a is illustrated within the first metaverse environment 242a. Likewise, a second experience zone 241b is illustrated with the second metaverse environment 242b. It is envisioned that the experience zones, when provided, may limit the effects of any virtual interaction to a virtual region within the experience zone, 241a, 241b, generally 241. In some embodiments, the existence and/or extent of an experience zone 241 may be determined according to a rule, a policy, a user preference and/or a condition as may be imposed upon any of the aforementioned interactivities between the metaverse environments 242a, 242b. For example, the experience zone 241 may be located adjacent to a first location within the first metaverse environment 242a corresponding to a virtual location of a virtual connection between the two metaverse environments 242a, 242b, e.g., abutting a virtual window, door, pathway or portal. In at least some embodiments, the experience zone 241a may provide and/or teleport one or more aspects of the second metaverse environment 242b from a predetermined location within the second metaverse environment as may be determined according to a corresponding virtual connection, e.g., between a first location (p1=x1, y1, z1) of the first metaverse environment 242a and a second location (p2=x2, y2, z2) of the second metaverse environment 242b.

It is envisioned that in at least some embodiments, more than one experience zone 241 may be provided. For example, a first user may indicate a user preference for a first inter-metaverse experience within a first experience zone 241a, whereas a second user may indicate a user preference for a second inter-metaverse experience within a third experience zone 241c. The first and third experience zones may differ according to one or more of range, duration, and/or level of experience.

Figure 2C:
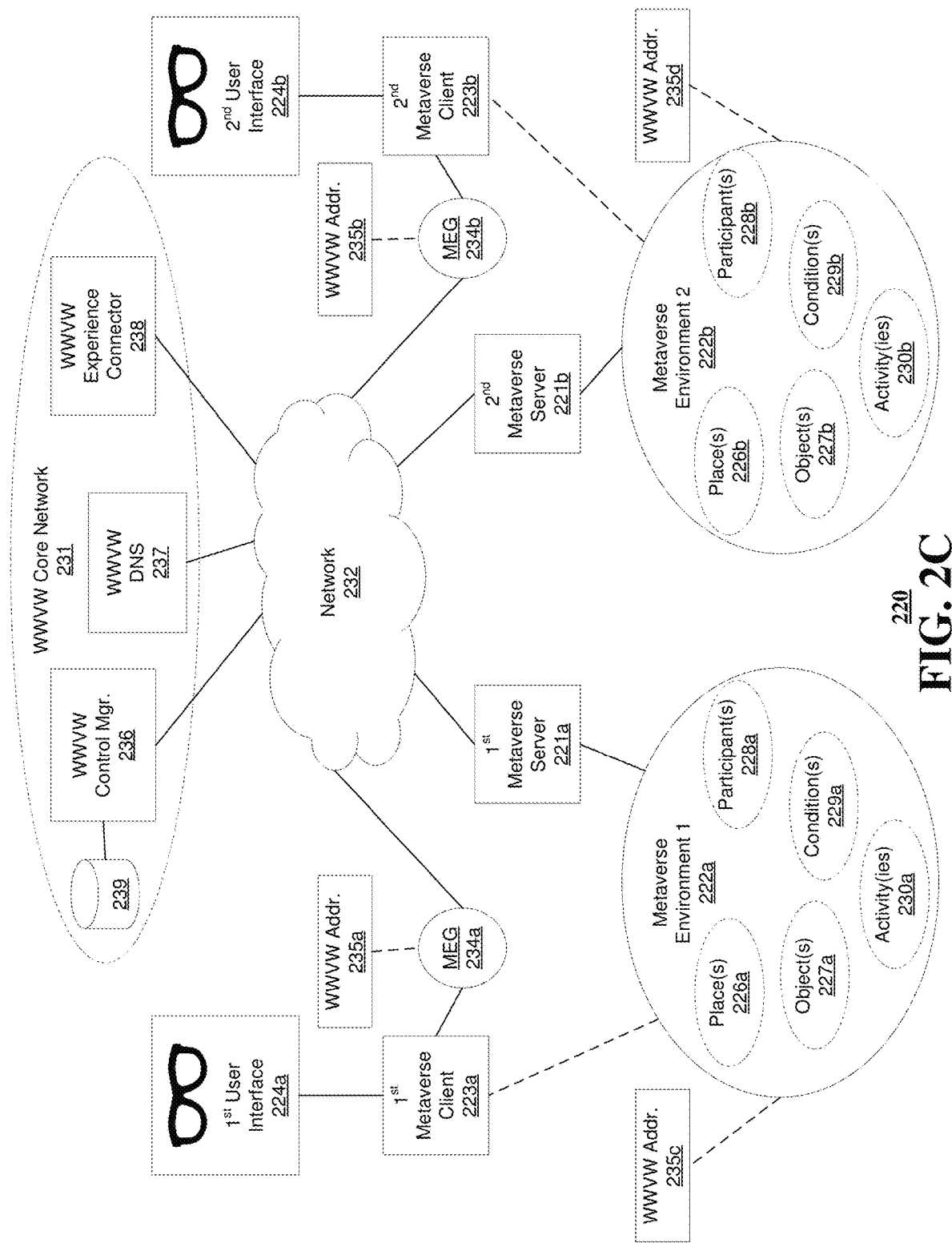
FIG. 2C is a block diagram illustrating another example, non-limiting embodiment of a world-wide virtual web (WWVW) system for computer-simulated environments functioning within the communication network of FIG. 1 in accordance with various aspects described herein.

FIG. 2C is a block diagram illustrating another example, non-limiting embodiment of a world-wide virtual web (WWVW) system 220 for computer-simulated environments functioning within the communication network of FIG. 1 in accordance with various aspects described herein. The WWVW system 220 includes a first metaverse server 221a configured to generate and/or otherwise maintain a first metaverse environment 222a and second metaverse server 221b configured to generate and/or otherwise maintain a second metaverse environment 222b. The example WWVW system 220 further include a first metaverse client 223a, a second metaverse client 223b and a WWVW core network 231. The first and second metaverse servers 221a, 221b, generally 221, the first and second metaverse clients 223a, 223b, generally 223, and the WWVW core network 231 are in communication with a network 232, such as a LAN and/or the Internet, that provides network connectivity for the exchange of communication signals and/or messages between the interconnected devices.

In more detail, the example WWVW system 220 includes a first MEG device 233a in communication between the first metaverse client 223a and the network 232 and a second MEG device 234b in communication between the second metaverse client 223b and the network 232. The first metaverse client 223a is connected to a first user interface 224a, and the second metaverse client 223b is connect to a second user interface 224b. The user interfaces 224a, 224b, generally 224, may include one or more devices adapted to provide physical stimuli responsive to one or more aspects of one or more of the metaverse environments 222a, 222b, generally 222. Aspects of the metaverse environments 222 may include, without limitation one or more place(s) 226a, 226b, generally 226, one or more object(s) 227a, 227b, generally 227, one or more participant(s) 228a, 228b, generally 228, one or more condition(s) 229a, 229b, e.g., 229, and/or one or more activity(ies) 230a, 230b, generally 230. the virtual aspects may generate virtual indications, e.g., sights, sounds, pressures, movements, and so on, within the virtual environment 222 that may be relayed by corresponding signals and/or message from the metaverse server 221 to the metaverse client 223. The metaverse client, in turn, may stimulate the user interface 224 accordingly to reproduce a physical indication that corresponds to the virtual indication of the virtual environment 222.

In at least some embodiments, the first MEG device 234a includes a first WWVW address 235a and the second MEG device 234b includes a second WWVW address 235b. Similarly, the first metaverse environment 222a includes a first WWVW address 235c and the second metaverse environment 222b includes a second WWVW address 235d. The WWVW addresses may be used to locate and/or otherwise interact with the metaverse environments.

It is understood that the WWVW may represent an information system that enables network access to one or more virtual reality environments, e.g., the metaverse environments 222, virtual experiences and/or virtual assets, such as avatars and objects, including digital property, such as the example place(s) 226, object(s) 227, participant(s) 228, condition(s) 229, and/or activity(ies) 230. Similar to documents and downloadable media being made available to a network through web servers, virtual environments, content and/or experiences may be made available to the network 232 via the WWVW core network 231. Core network servers may include, without limitation, one or more of a WWVW DNS server 237, a WWVW control manager 236 and/or a WWVW experience connector 238.

It is envisioned that in at least some embodiments, hostnames used for the World Wide Virtual Web assets may begin with an identifying character string, e.g., "wvvw," because of the long-standing practice of naming Internet hosts according to the services they provide. In at least some instances, the hostnames may appear as domain name system (DNS) or subdomain names. WWVW assets of a WWVW system may include a virtual environment object suitable for interpretation by a virtual environment application program.

Similar to the WWW, Uniform Resource Identifier (URI) providing a unique sequence of characters that identifies a logical or physical resource used by WWVW technologies may be utilized by the WWVW servers. In the context of a WWVW logical overlay to the Internet, URIs may be used to identify virtual reality environments, virtual experiences and/or virtual assets, such as avatars and objects, including digital property. Some URIs may provide a means of locating and retrieving metaverse resources on a network (either on the Internet or on another private network, such as a computer filesystem or an Intranet), akin to a Uniform Resource Locators (URLs).

In at least some embodiments, a content management unit, such as the WWVW control manager 236, may grant a globally unique identifier that is unique in a multiverse, to identify contents managed by the metaverse—multiverse content management unit may receive content addresses of a specific metaverse server from the integrated content as a form of globally unique identifier. Each metaverse service may include, respectively, a metaverse server 221 adapted to provide access to a metaverse environment 222 service through a user client system 223. The metaverse server 221 may include a communication channel unit connected to the user client systems 223, e.g., through a wired and/or wireless channel. In at least some embodiments, the first metaverse server 221a may include one or more of a first user server, a first asset server, and a first inventory server, or a first metaverse database. Likewise, the second metaverse server 221b may include one or more of a second user server, a second asset server, and a second inventory server, or a second metaverse database. For example, the first user server may take charge of a first login process including user authentication for accessing a first metaverse environment 222a. Similarly, the second user server may take charge of a second login process including user authentication for accessing a second metaverse environment 222a. Access to the second metaverse environment from a perspective of the first metaverse environment 222a may require completion of the second login process. In such instances, the second login process may be initiated and/or otherwise coordinated by the WWVW core network, e.g., by the WWVW control manager 236 and/or the subscription manager 205 (FIG. 2A). The asset server and the inventory server may manage metaverse data, as may be necessary for execution of a metaverse environment, and metaverse contents such as user's avatars, environmental conditions, objects, possibly including user-created items.

It is envisioned that one or more of the metaverse servers, e.g., the WWVW control manager 236, the DNS server 237 and/or the WWVW experience connector 238, the user server, the asset server, the inventor server or the metaverse database may be associated with a WWVW address 235a, 235b, 235c, 235d, generally 235. The MEG device 234 may access one or more resources of a metaverse 222 according to the WWVW address 235. In at least some embodiments, the MEG device 210 may access and/or interact with one or more network-accessible assets via the WWVW address 235.

According to the illustrative example, the WWVW core network may include a storage function, such as the example database 239. The database 239 may be in communication with one or more of the WWVW control manager 236, the WWVW DNS server 237 and/or the WWVW experience connector 238. The database 239 may store one or more records related to one or more of WWVW addresses 235a, user preferences, device types and/or requirements, e.g., APIs, of user interface devices of the user interface 224. Alternatively or in addition, the database 239 may store one or more of user credentials, subscription information, authorizations information, user preferences, policies, rules and/or conditions as may be determined and/or otherwise defined by the metaverse service providers, metaverse client configurations, network restrictions, and so on.

In at least some embodiments, the MEG devices 234 may be provided in physical devices. The MEG devices 234 may be adapted to support and/or otherwise facilitate control of one or more devices of a user interface 224, e.g., enabling control of a user's virtual reality (VR), augmented reality (AR) and/or extended reality (XR) devices.

In at least some embodiments, the MEG devices 234 may be configurable. For example, the MEG devices 234 may be configured according to user preferences, e.g., to set levels of stimuli, such as audio levels, display brightness, contrast and/or focus, haptic device configurations. Alternatively, or in addition, the MEG devices 234 may be configured according to user preferences related to interconnection of multiple virtual environments. In at least some embodiments, user profiles, e.g., to establish one or more of exclusions and/or access restrictions or rules. Alternatively, or in addition, the user profiles may be used to capture one or more individual experience tailoring to preferences, likes, dislikes, tolerances, medical conditions, such as hearing loss, vision impairments, seizures, and so on. It is understood that two or more MEG devices 234 create a direct secure channel, e.g., a VPN, between them, possibly through one or more of the WWVW control manager 236 and/or the WWVW experience connector 238, but will ultimately have a secure bridge between them When users purchase the MEG device 234, it may be configured with a WWVW Core Address. When the MEG device 234 is connect it to the Internet it may reach out to the WWVW core network 231, e.g., via standard networking elements and IP addresses. The WWVW core network 231, in turn, may assign a WWVW address to the MEG device 234 and create a corresponding MEG device profile. The profile may identify capabilities of the MEG device 234, configured parameters of the MET device 234 and/or interconnected devices, such as metaverse environments 222, metaverse clients 223 and/or user interface devices 224.

Each user may configure their respective MEG device(s) 234 with one or more security policies and/or rules, e.g., do not bring strange holograms into my virtual space, or verify the age of a holographic game player before allowing them to join my virtual game. At least some, if not all user profiles and/or preferences may be stored and managed by WWVW core network 231, e.g., according to a WWVW subscription manager 205. (FIG. 2A). The WWVW core network 231, in turn, may follow a status, e.g., On/Off status, and/or physical and/or network location of the MEG device 234.

The WWVW core network 231 may stores the MEG WWVW address 234 alone or along with user information such as username, virtual space meeting identifier, game location, etc. In at least some embodiments, addresses 235 and/or MEG device configurations and/or user preferences may be stored in the WWVW DNS server 237. Accordingly, if a first wants to have a virtual object sent to a second user, the WWVW DNS server 237 is able to identify, by the stored information, the corresponding WWVW and/or IP addresses for the required MEG device(s) 234.

The system allows someone without a virtual environment to join a virtual environment session via the WWVW DNS server 237 may be analogized to someone with a laptop connecting to the Internet via a hotspot. In such instances, someone with a laptop may access a virtual environment, with the help of a WWVW core network 231 and select what actions they want to do such as: join only audio to listen to conversation in this virtual environment; join only video to see; and/or sending only video and/or audio.

Figure 2D:
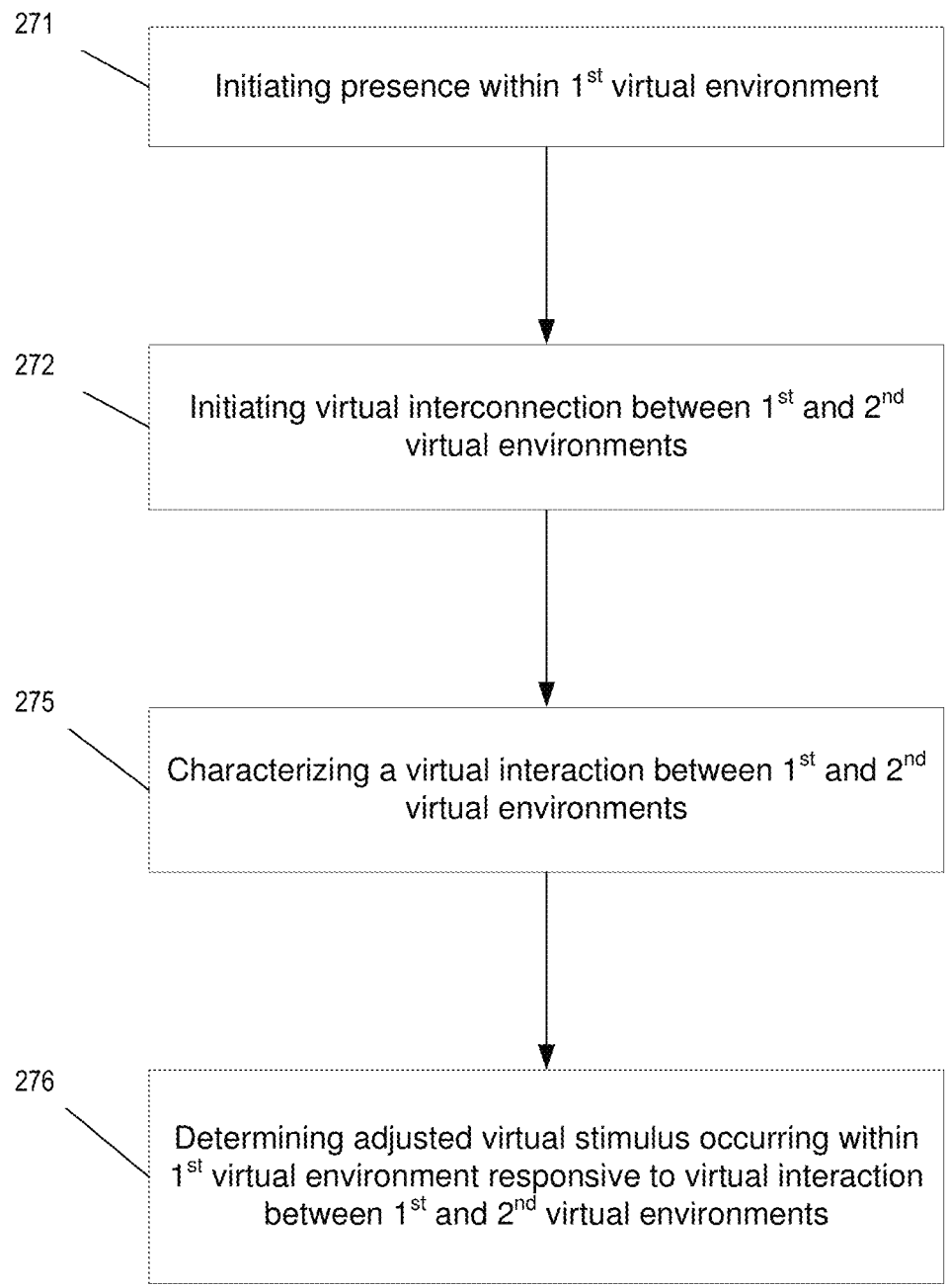
FIG. 2D depicts an illustrative embodiment of a process in accordance with various aspects described herein.

FIG. 2D depicts an illustrative embodiment of a process 270 in accordance with various aspects described herein. According to the example process 270, a presence is initiated at 271 within a first virtual environment. A presence may be determined according to a subscriber or user participating in the first virtual environment, which may occur through introduction of an avatar within the first virtual environment. The avatar may be configured by the user and provide the user with a perspective and/or point of view of conditions withing the first virtual environment that correspond to a location of the avatar within the first virtual environment. The user may experience one or more aspects and/or conditions of the first virtual environment via a human interface. The human interface may include one or more devices adapted to present physical stimuli that may include one or more of a graphical rendering of the first virtual environment from a perspective of the avatar, an audio representation of the first virtual environment from the perspective of the avatar, a tactile representation of the first virtual environment from the perspective of the avatar, along with one or more of a temperature, pressure, movement, and so on.

A virtual interconnection is initiated at 272 between the first and second virtual environments. A second virtual environment may be identified, e.g., selected by the user and/or by another participant present within the first and/or second virtual environments. A virtual interconnection may be initiated, effectively joining at least one area, e.g., corresponding to a window, a door and/or a portal, with another interconnected area of the second virtual environment. In at least some embodiments, the virtual interconnection may be presented graphically within the first and/or second virtual environments.

A virtual interaction between the first and second virtual environments is characterized at 275. It is understood that conditions within the first virtual environment and the second virtual environment may be different, and perhaps radially different. Nevertheless, each virtual environment will have various aspects describing a virtual reality of the respective virtual environment, which may be described in particular proximal to a location of the virtual interconnection. A characterization of an interaction of the two virtual environments may be determined based at least in part on the respective virtual conditions. For example, a temperature difference may be characterized as a temperature gradient as might be experienced in a physical environment, but perhaps with some limitation as to an extent.

In at least some embodiments, a characterization of the virtual environment may be determined before any adjustments are made to either of the virtual environments. In some embodiments, the virtual interaction may be blocked entirely, e.g., based on an incompatibility and or perceived danger. For example, interconnecting an office environment to a deep space or a deep-sea environment might prove catastrophic and thus be prevented. For example, the interconnection location may be presented graphically, but with some indication of danger or incompatibility, e.g., a warning sign, and/or graphical representation of a bar or gate.

An adjusted virtual stimulus is determined at 276. The adjusted virtual stimulus may be modulated by one or more rules, policies, conditions and/or user preferences. Such modulations may permit a virtual interaction, even a potentially dangerous and/or uncomfortable one, by imposing some measure of restriction. Such restrictions may be determined according to policies, rules, conditions and/or user preferences. It is envisioned that in at least some embodiments, introduction of the virtual interaction may result in multiple characterizations, e.g., according to multiple different user preferences of different avatars exposed to a region of interaction. For example, exposure of a tropical environment to an artic environment may result in extreme temperature shift experienced by one avatar according to a corresponding user preference, while the same exposure may result in a mild, or perhaps no temperature shift experienced by another avatar according to another corresponding user preference.

While for purposes of simplicity of explanation, the respective processes are shown and described as a series of blocks in FIGS. 2D, 2E and 2F, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 3:
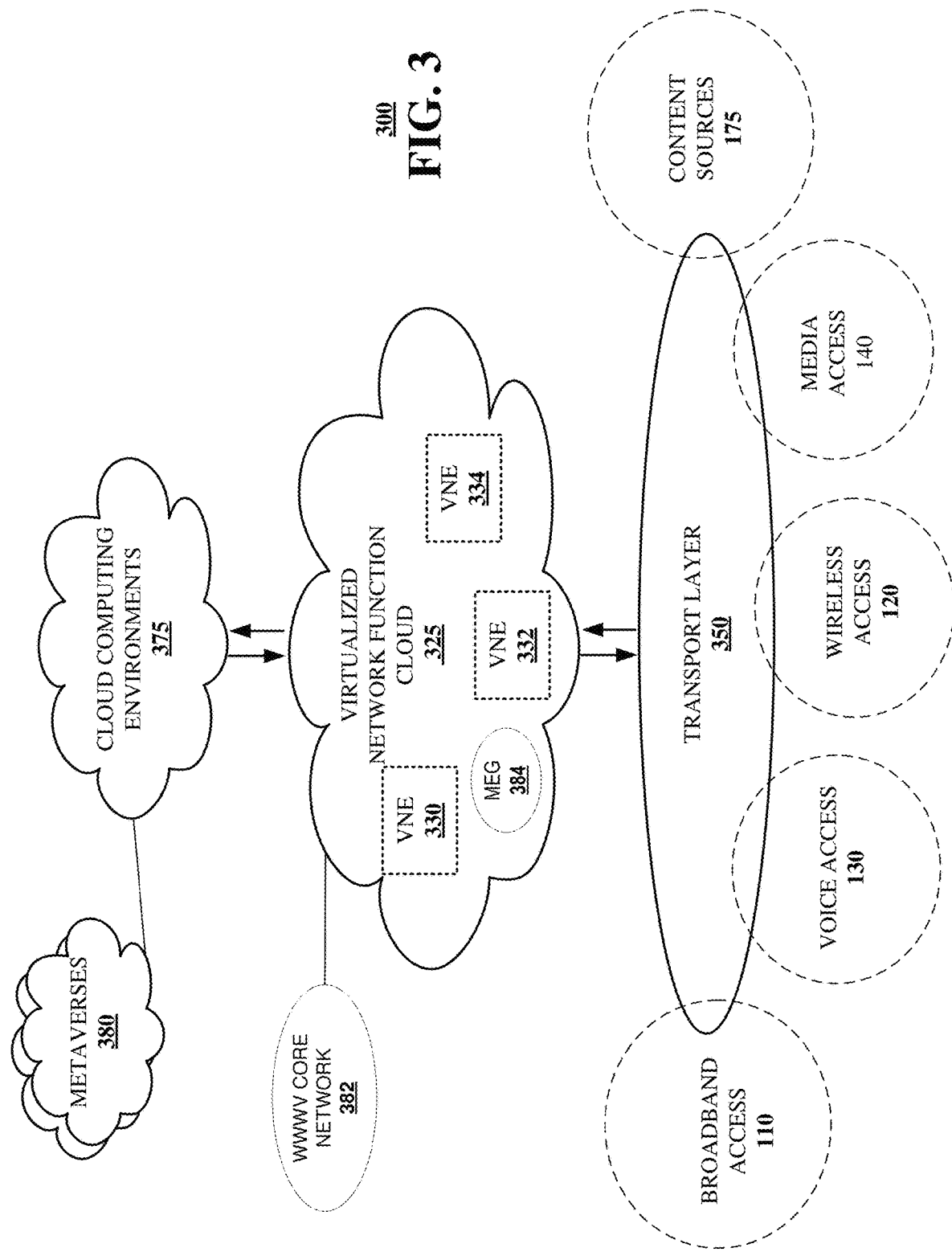
FIG. 3 is a block diagram illustrating an example, non-limiting embodiment of a virtualized communication network in accordance with various aspects described herein.

Referring now to FIG. 3, a block diagram is shown illustrating an example, non-limiting embodiment of a virtualized communication network 300 in accordance with various aspects described herein. In particular a virtualized communication network is presented that can be used to implement some or all of the subsystems and functions of system 100, the subsystems and functions of systems 200, 220, 240, and processes 270, 280, 290 presented in FIGS. 1, 2A, 2B, 2C, 2D, and 3. For example, virtualized communication network 300 can facilitate in whole or in part initiating a virtual interconnection between first and second virtual environments, determining a virtual interaction between the two virtual environments according to the virtual interconnection, and determining an adjusted virtual stimulus occurring within the first virtual environment responsive to the virtual interaction between the two virtual environments, wherein a presence within the first virtual environment is adjusted according to a correlation between a physical stimulation of the human interface and the adjusted virtual stimuli.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc., that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it is elastic: so, the resources are only consumed when needed. In a similar fashion, other network elements such as other routers, switches, edge caches, and middle boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc., to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements do not typically need to forward large amounts of traffic, their workload can be distributed across a number of servers—each of which adds a portion of the capability, and which creates an elastic function with higher availability overall than its former monolithic version. These virtual network elements 330, 332, 334, etc., can be instantiated and managed using an orchestration approach similar to those used in cloud compute services.

The cloud computing environments 375 can interface with the virtualized network function cloud 325 via APIs that expose functional capabilities of the VNEs 330, 332, 334, etc., to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

The example virtualized communication network 300 further includes a WWVW core network 382 in communication with the virtualized network function cloud 325. The WWVW core network 382 may implement any of the various functionalities disclosed herein in relation to the WWVW core network, such as those discussed in relation to the WWVW core network 203 (FIG. 2A). In at least some embodiments, the example virtualized communication network 300 may include one or more MEG devices 384. Each MEG device 384 may be associated with a corresponding one of a number of different metaverses 380. It is envisioned that the MEG devices 382 may implement any of the various functionalities disclosed herein in relation to the MEG devices, such as those discussed in relation to the MEG devices 234 (FIG. 2C).

Figure 4:
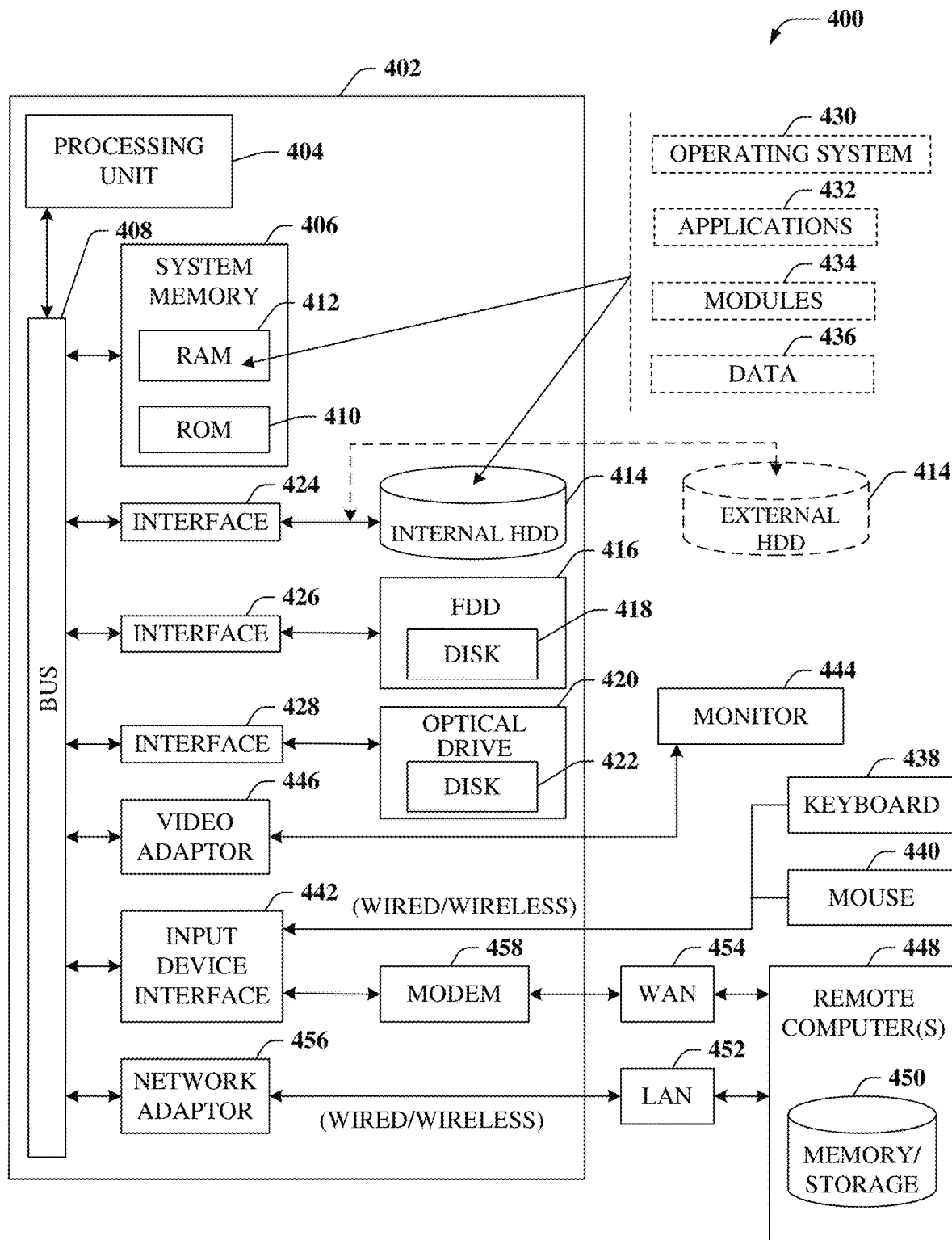
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part initiating a virtual interconnection between first and second virtual environments, determining a virtual interaction between the two virtual environments according to the virtual interconnection, and determining an adjusted virtual stimulus occurring within the first virtual environment responsive to the virtual interaction between the two virtual environments, wherein a presence within the first virtual environment is adjusted according to a correlation between a physical stimulation of the human interface and the adjusted virtual stimuli.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high-capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
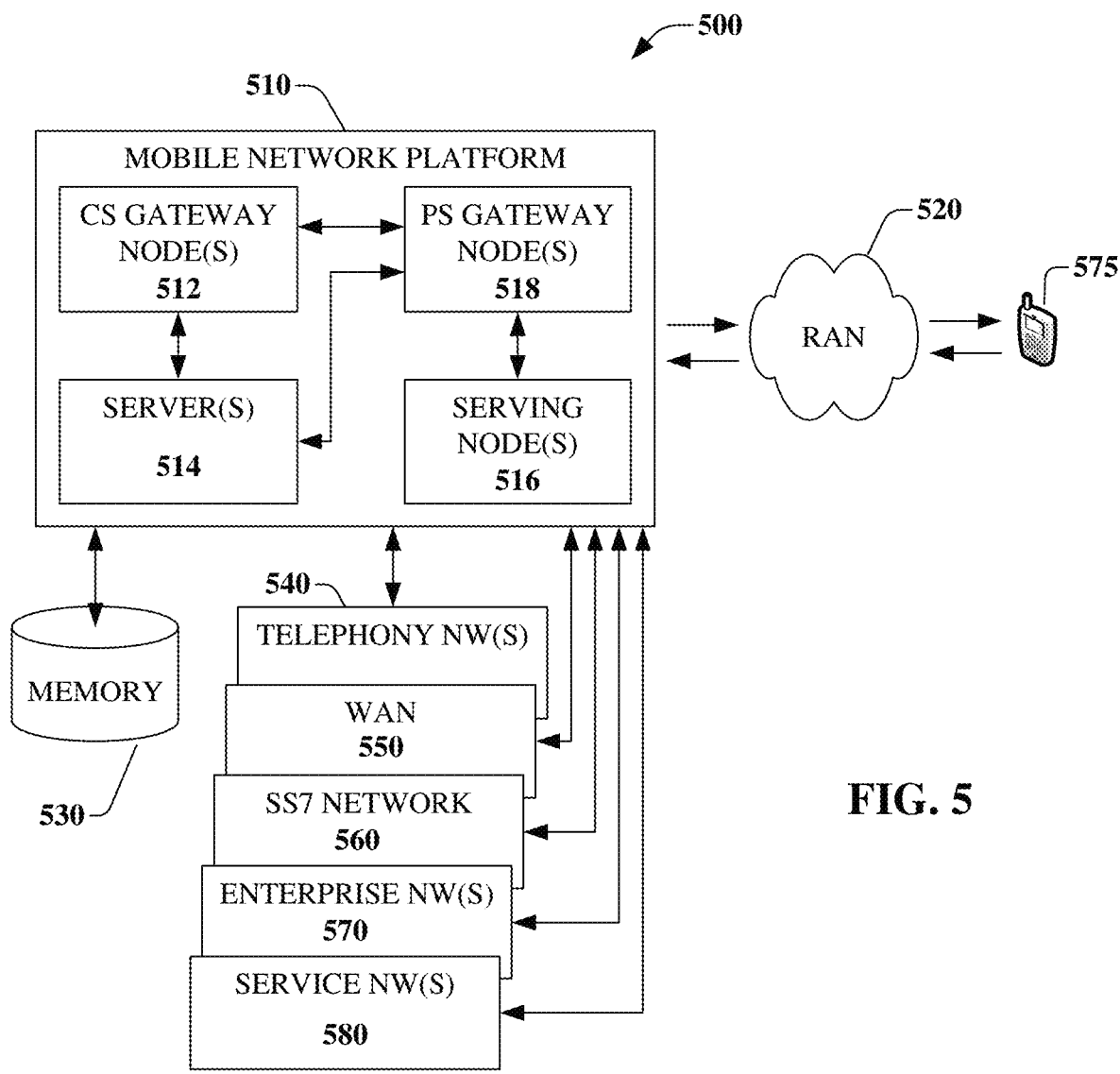
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part initiating a virtual interconnection between first and second virtual environments, determining a virtual interaction between the two virtual environments according to the virtual interconnection, and determining an adjusted virtual stimulus occurring within the first virtual environment responsive to the virtual interaction between the two virtual environments, wherein a presence within the first virtual environment is adjusted according to a correlation between a physical stimulation of the human interface and the adjusted virtual stimuli. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, which facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc., that perform particular tasks and/or implement particular abstract data types.

Figure 6:
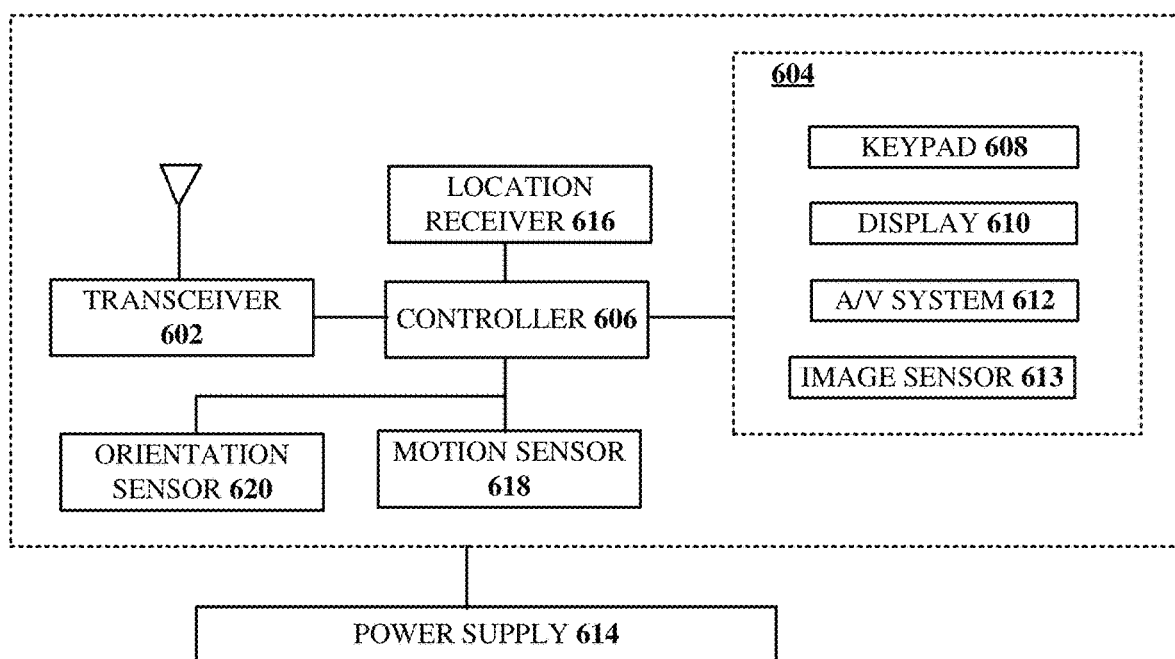
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part initiating a virtual interconnection between first and second virtual environments, determining a virtual interaction between the two virtual environments according to the virtual interconnection, and determining an adjusted virtual stimulus occurring within the first virtual environment responsive to the virtual interaction between the two virtual environments, wherein a presence within the first virtual environment is adjusted according to a correlation between a physical stimulation of the human interface and the adjusted virtual stimuli The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x_1, x_2, x_3, x_4 \ldots x_n)$, to a confidence that the input belongs to a class, that is, $f(x)$=confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A system, comprising:
a processing system including a processor; and
a memory that stores executable instructions that, when executed by the processing system, facilitate performance of operations, the operations comprising;
establishing a first presence within a first metaverse environment, wherein the first presence comprises a first correlation between a first physical stimulation of a first human interface and first virtual stimuli occurring within the first metaverse environment;
establishing a virtual interconnection between the first metaverse environment and a second metaverse environment comprising second virtual stimuli occurring within the second metaverse environment;
characterizing a virtual interaction between the first metaverse environment and the second metaverse environment according to the virtual interconnection between the first metaverse environment and the second metaverse environment; and identifying a first adjusted virtual stimuli occurring within the first metaverse environment responsive to the virtual interaction between the first metaverse environment and the second metaverse environment, wherein the first presence is adjusted according to a correlation between the first physical stimulation of the first human interface and the first adjusted virtual stimuli occurring within the first metaverse environment.

2. The system of claim 1, wherein the establishing the virtual interconnection further comprises:
identifying the second metaverse environment; and
initiating access to the second metaverse environment.

3. The system of claim 2, wherein the initiating access to the second metaverse environment further comprises:
obtaining user credentials; and
initiating an authentication process for the second metaverse environment, wherein access to the second metaverse environment is based on the authentication process authenticating the user credentials.

4. The system of claim 1, wherein the establishing the virtual interconnection further comprises:
identifying a virtual connection rule; and
applying the virtual connection rule to the virtual interconnection, wherein the characterizing the virtual interaction between the first metaverse environment and the second metaverse environment is further based on the virtual connection rule.

5. The system of claim 4, wherein the virtual connection rule comprises a user preference.

6. The system of claim 5, wherein the user preference comprises a limit, wherein the identifying the first adjusted virtual stimuli occurring within the first metaverse environment is further based on the limit.

7. The system of claim 1, wherein the operations further comprise:
determining an experience zone, wherein the characterizing the virtual interaction between the first metaverse environment and the second metaverse environment is restricted to the experience zone.

8. The system of claim 1, wherein the operations further comprise:
identifying a second adjusted virtual stimuli occurring within the second metaverse environment responsive to the virtual interaction between the first metaverse environment and the second metaverse environment, wherein a second presence within second metaverse environment is adjusted according to a second correlation between a second physical stimulation of a second human interface and the second adjusted virtual stimuli occurring within the second metaverse environment.

9. The system of claim 1, wherein the operations further comprise:
manipulating the first physical stimulation of the first human interface according to the first correlation between the first physical stimulation of the first human interface and the first virtual stimuli occurring within the first metaverse environment.

10. The system of claim 1, wherein the operations further comprise:
manipulating the first virtual stimuli occurring within the first metaverse environment according to the first correlation between the first physical stimulation of the first human interface and the first virtual stimuli occurring within the first metaverse environment.

11. The system of claim 1, wherein the first virtual stimuli comprise one of an image, a sound, a pressure, a temperature, text, or any combination thereof.

12. A method, comprising:
initiating, by a processing system comprising a processor, a presence within first metaverse environment, wherein the presence comprises a correlation between a physical stimulation of a human interface and first virtual stimuli occurring within the first metaverse environment;
initiating, by the processing system, a virtual interconnection between the first metaverse environment and a second metaverse environment comprising second virtual stimuli occurring within the second metaverse environment;
identifying, by the processing system, a virtual interaction between the first metaverse environment and the second metaverse environment according to the virtual interconnection between the first metaverse environment and the second metaverse environment; and
determining, by the processing system, an adjusted virtual stimuli occurring within the first metaverse environment responsive to the virtual interaction between the first metaverse environment and the second metaverse environment, wherein the presence is adjusted according to a correlation between the physical stimulation of the human interface and the adjusted virtual stimuli occurring within the first metaverse environment.

13. The method of claim 12, further comprising:
identifying, by the processing system, the second metaverse environment; and
initiating, by the processing system, access to the second metaverse environment.

14. The method of claim 12, further comprising:
determining, by the processing system, an experience zone, wherein the identifying the virtual interaction between the first metaverse environment and the second metaverse environment is restricted to the experience zone.

15. The method of claim 12, wherein the first metaverse environment comprises a first world-wide virtual web address and wherein the second metaverse environment comprises a second world-wide virtual web address, wherein the initiating, by the processing system, the virtual interconnection between the first metaverse environment and a second metaverse environment is based a routing of information from the second world-wide virtual web address.

16. The method of claim 12, wherein the physical stimulation comprises one of an image, a sound, a pressure, a temperature, text, or any combination thereof.

17. The method of claim 12, further comprising:
determining, by the processing system, an experience zone, wherein characterizing the virtual interaction between the first metaverse environment and the second metaverse environment is restricted to the experience zone.

18. A non-transitory machine-readable medium, comprising executable instructions that, when executed by a processing system including a processor, facilitate performance of operations, the operations comprising:
initiating a presence within first metaverse environment, wherein the presence comprises a correlation between a physical stimulation of a human interface and first virtual stimuli occurring within the first metaverse environment;

initiating a virtual interconnection between the first metaverse environment and a second metaverse environment comprising second virtual stimuli occurring within the second metaverse environment;

determining a virtual interaction between the first metaverse environment and the second metaverse environment according to the virtual interconnection between the first metaverse environment and the second metaverse environment; and determining an adjusted virtual stimulus occurring within the first metaverse environment responsive to the virtual interaction between the first metaverse environment and the second metaverse environment, wherein the presence is adjusted according to a correlation between the physical stimulation of the human interface and the adjusted virtual stimuli occurring within the first metaverse environment.

19. The non-transitory machine-readable medium of claim 18, wherein the operations further comprise:
identifying the second metaverse environment; and
initiating access to the second metaverse environment.

20. The non-transitory machine-readable medium of claim 18, wherein the operations further comprise:
determining an experience zone, wherein the determining the virtual interaction between the first metaverse environment and the second metaverse environment is restricted to the experience zone.

* * * * *